United States Patent
Sunami (10) Patent No.: US 7,248,932 B2
(45) Date of Patent: Jul. 24, 2007

(54) ELECTRONIC CONTROL UNIT

(75) Inventor: Kenji Sunami, Obu (JP)

(73) Assignee: DENSO Corporation, Kariya (JP)

( * ) Notice: Subject to any disclaimer, the term of this patent is extended or adjusted under 35 U.S.C. 154(b) by 414 days.

(21) Appl. No.: 10/759,070

(22) Filed: Jan. 20, 2004

(65) Prior Publication Data

US 2004/0148036 A1    Jul. 29, 2004

(30) Foreign Application Priority Data

Jan. 23, 2003    (JP) .............................. 2003-015323

(51) Int. Cl.
G05B 9/02 (2006.01)
G05B 11/01 (2006.01)
G06F 7/00 (2006.01)
G06G 7/70 (2006.01)

(52) U.S. Cl. ...................... 700/79; 700/21; 700/82; 701/107; 701/114

(58) Field of Classification Search .............. 700/21, 700/24, 28, 79, 82; 701/101–115; 702/57–58, 702/116–118, 182–183, 188, 184–186; 326/16; 123/399; 714/11, 21, 49–51, 55; 708/188
See application file for complete search history.

(56) References Cited

U.S. PATENT DOCUMENTS

| | | | |
|---|---|---|---|
| 4,748,567 A * | 5/1988 | Sumizawa et al. .......... 701/114 |
| 5,548,601 A | 8/1996 | Kato et al. | |
| 5,880,568 A * | 3/1999 | Bederna et al. ............. 318/563 |
| 5,966,305 A * | 10/1999 | Watari et al. ................. 700/82 |
| 5,980,081 A * | 11/1999 | Watari et al. ................. 700/79 |
| 6,230,094 B1 * | 5/2001 | Ohashi et al. ............... 701/107 |
| 6,243,629 B1 * | 6/2001 | Sugimoto et al. ............. 701/29 |
| 6,356,821 B1 * | 3/2002 | Yoshida ........................ 701/31 |
| 6,628,993 B1 * | 9/2003 | Bauer ........................... 700/20 |
| 6,804,564 B2 * | 10/2004 | Crispin et al. ................ 700/79 |
| 6,879,891 B1 * | 4/2005 | Bederna ........................ 701/29 |
| 6,934,874 B2 * | 8/2005 | Retter et al. .................... 714/4 |
| 6,937,933 B1 * | 8/2005 | Jautelat et al. .............. 701/114 |
| 6,990,404 B2 * | 1/2006 | Takeuchi ..................... 701/114 |
| 2003/0171858 A1 * | 9/2003 | Kondo .......................... 701/29 |
| 2005/0050387 A1 * | 3/2005 | Mariani et al. ............... 714/13 |

FOREIGN PATENT DOCUMENTS

| | | |
|---|---|---|
| GB | 2281791 A | 3/1995 |
| JP | 6-137182 | 5/1994 |
| JP | 6-149626 | 5/1994 |
| JP | 2001-202129 | 7/2001 |

* cited by examiner

*Primary Examiner*—Anthony Knight
*Assistant Examiner*—Jennifer L. Norton
(74) *Attorney, Agent, or Firm*—Nixon & Vanderhye P.C.

(57) ABSTRACT

A main CPU transmits data used in determination of whether or not a target throttle opening degree calculation logic and an estimated target throttle opening degree calculation logic are normal (a target degree and an estimated target degree of throttle opening, and a dummy estimated target degree of throttle opening and an expected value) to a sub-CPU. The sub-CPU compares the data pieces in each of the pairs so as to calculate monitor data for monitoring whether or not the determination result in the main CPU is correct. In this manner, it is possible to enhance reliability of the routine for determining whether or not the respective logics are normal.

16 Claims, 7 Drawing Sheets

```
DUMMY DATA TBL [1]

* INPUT DATA
  · WATER TEMPERATURE DUMMY DATA [1]=80.0°C
  · ACCELERATOR PEDAL OPENING DEGREE
    DUMMY DATA [1]=2.0 DEG
  · VEHICLE SPEED DUMMY DATA [1]=40km/h
        :

* EXPECTED VALUE
  ·  EXPECTED VALUE OF ESTIMATED
     TARGET DEGREE [1]=2.5 DEG
```

```
DUMMY DATA TBL [2]

* INPUT DATA
  · WATER TEMPERATURE DUMMY DATA [2]=20.0°C
  · ACCELERATOR PEDAL OPENING DEGREE
    DUMMY DATA [2]=5.0 DEG
  · VEHICLE SPEED DUMMY DATA [2]=0km/h
        :

* EXPECTED VALUE
  ·  EXPECTED VALUE OF ESTIMATED
     TARGET DEGREE [2]=5.5 DEG
```

ELECTRONIC CONTROL UNIT

CROSS REFERENCE TO RELATED APPLICATIONS

This application is based upon, claims the benefit of priority of, and incorporates by reference Japanese Patent Application No. 2003-15323 filed Jan. 23, 2003.

FIELD OF THE INVENTION

This invention relates to an electronic control unit having two computers in which each computer monitors whether or not the other computer is operating normally.

BACKGROUND OF THE INVENTION

Generally, an electronic control unit including two computers is known in which each computer monitors whether or not the other computer is operating normally. For example, an electronic control unit described in Japanese Patent Laid-Open Publication No. Hei 10-83321 (1998) controls a throttle valve of an internal combustion engine in a vehicle and includes a main CPU and a sub-CPU, wherein the operation of the main CPU is monitored by the sub-CPU. More specifically, the same temperature of coolant, the same accelerator pedal opening degree and the same position of a transmission gear in the internal combustion engine are input in the main CPU and the sub-CPU. The main CPU and the sub-CPU calculate a degree of throttle opening using the same arithmetic expression. Then, the sub-CPU receives the main CPU throttle opening degree calculated by the main CPU and determines whether or not the received main CPU throttle opening degree is coincident with the sub-CPU throttle opening degree calculated by the sub-CPU.

Moreover, in order to determine whether or not such a monitor routine of the main CPU is performed appropriately, the sub-CPU executes a determination routine for the monitor routine logic. In this determination routine, a sub-routine for the aforementioned monitor routine is executed using dummy data of the temperature of coolant, the accelerator pedal opening degree, and the gear position in the internal combustion engine. Then, the degree of throttle opening calculated by execution of that sub-routine is compared to an expected value of throttle opening prepared in advance to correspond to the aforementioned dummy data. When the degree of throttle opening calculated based on the dummy data is coincident with the expected value prepared in advance in that comparison, the monitor routine logic is determined to function normally.

However, according to the conventional technique mentioned above, it is determined only by the sub-CPU whether or not the monitor routine logic functions normally. Therefore, in a case where a determination command (comparison command or the like) in the sub-CPU is abnormal, there is a possibility that correct determination will not be performed. Thus, the conventional technique has a problem in that reliability of monitoring the operation of the main CPU by the sub-CPU is not sufficiently ensured.

SUMMARY OF THE INVENTION

The present invention was made considering the aforementioned problem of the conventional technique and aims to provide an electronic control unit including two computers in which it is possible to monitor, by the first computer, a routine for determining whether or not a predetermined logic function in the second computer functions normally.

In order to achieve the above object, according to a first aspect of the invention, an electronic control unit has a first computer and a second computer and outputs a control signal for an object of control based on a predetermined detection signal. The first computer includes a determination routine unit operable to, in order to check an abnormal state of a logic function for operating the control signal based on the predetermined detection signal, operate a dummy control signal. The dummy control signal uses dummy data stored in advance in accordance with the logic function and determines whether or not a relationship between the dummy control signal and an expected value of the dummy control signal, which is stored with respect to the dummy data in advance, is normal. A transmission unit operates to transmit, to the second computer, the dummy control signal and the expected value thereof that are used in a determination routine by the determination routine unit.

The second computer includes a receiving unit operable to receive the dummy control signal and the expected value thereof and a monitor routine unit. The monitor routine unit operates to compare the dummy control signal and the expected value thereof received by the receiving unit so as to perform a calculation routine for calculating monitor data. The monitor data is for monitoring whether or not a result of the determination routine by the determination routine unit is correct. The electronic control unit comprises a fail-safe routine unit operable to perform a fail-safe routine based on the determination result by the determination routine unit and the monitor data by the monitor routine unit.

As described above, the dummy control signal and the expected value thereof that are used in the determination routine for checking the abnormal state of the logic function in the first computer are transmitted to the second computer. The monitor routine unit of the second computer then compares the dummy control signal and the expected value thereof, thereby performing the calculation routine for calculating the monitor data for monitoring whether or not the result of the determination routine in the determination routine unit of the first computer is correct. Therefore, it is possible to enhance reliability of the determination routine in the first computer based on the monitor data calculated by the monitor routine unit of the second computer.

According to a second aspect of the invention, it is preferable that the logic function include a first logic function for operating the control signal based on the predetermined detection signal and a second logic function, configured more simply than the first logic function, for operating a simplified control signal based on the predetermined detection signal. It is also preferable that the determination routine unit further determine whether or not a relationship between the control signal operated in accordance with the first logic function and the simplified control signal operated in accordance with the second logic function is normal.

In this manner, the operation load can be reduced by using the second logic function configured more simply than the first logic function in order to obtain a signal serving as a reference for determining whether or not the control signal operated in accordance with the first logic function is correct, instead of performing the same operation as the first logic function. Please note that the simplified control signal operated in accordance with such a simplified second logic function is not always coincident with the control signal operated in accordance with the first logic function. However, by configuring the second logic function in such a manner that the simplified control signal is larger than the control signal or the difference between the simplified control signal and the control signal is equal to or less than a predetermined value, for example, it is possible to determine whether the control signal is normal or abnormal from the magnitude of the relationship between the simplified control signal and the control signal or the magnitude of the difference between them.

According to a third aspect of the invention, in a case where the logic function includes the first and second logic functions, as described above, it is preferable that the determination routine unit input the dummy data to the second logic function to operate a dummy simplified control signal and determine whether or not a relationship between the dummy simplified control signal and its expected value is normal. In this case, it is possible to determine whether or not the second logic function for calculating the simplified control signal used as the reference for determining whether the control signal is normal or abnormal is correct. Thus, it is also possible to check whether or not determination of the normal state and the abnormal state of the control signal is performed normally. Moreover, by calculating the dummy simplified control signal in accordance with the second logic function configured more simply, it is possible to reduce the operation load for calculating the dummy control signal.

According to a fourth aspect of the invention, it is preferable that the transmission unit transmit the control signal and the simplified control signal, as well as the dummy control signal and its expected value, to the second computer. It is also preferable that a diagnosis routine unit further compare the control signal with the simplified control signal to diagnose whether or not the determination routine in the determination routine unit functions normally. In this manner, it is possible to further enhance the reliability of the determination routine in the determination routine unit.

According to a fifth aspect of the invention, it is preferable that a plurality of types of the dummy data are prepared. Additionally, when determining that the relationship between the dummy control signal and the expected value thereof is normal, the determination routine unit repeats the determination routine while changing the plurality of types of dummy data. When determining that the relationship between the dummy control signal and the expected value thereof is abnormal in the previous determination routine, the determination routine unit operates the dummy control signal by using the same dummy data as that used in the previous determination routine and determines whether or not the relationship between the thus calculated dummy control signal and its expected value is normal again.

The computer may operate abnormally only for data having a specific pattern, for example, when the control signal is calculated in accordance with the aforementioned logic function. In this case, after the data pattern used in the operation is changed, such an abnormal operation does not occur and therefore it is determined that the operation is normal. Thus, in order to ensure the determination of the abnormal state even in a case when the computer operates abnormally only for the data having such a specific pattern, it is preferable to operate the dummy control signal by using the same dummy data again when the abnormal state is determined.

It is not preferable to perform the fail-safe routine such as a routine for stopping the control, when the dummy control signal and its expected value are compared and it is determined that the relationship between them is not normal only once in the first or second computer. This is because one determination of the abnormal state may be caused by a simple error for retrieving data, for example, and therefore it is difficult to determine with certainty that the first computer is in the abnormal state in the first computer. Thus, as described above, the determination of whether or not the relationship between the dummy control signal and its expected value for the same dummy data is normal is performed more than once.

According to a sixth aspect of the present invention, in a case where it is determined, by the determination routine unit whether the relationship between the dummy control signal and its expected value is normal or abnormal, that that relationship is abnormal a predetermined number of times, or in a case where the monitor data, indicating that the determination routine by the determination routine unit is to determine that the relationship between the dummy control signal and its expected value is abnormal, is calculated in the monitor routine unit a predetermined number of times, it is preferable that the abnormal state of the determination routine is settled and the fail-safe routine unit perform different fail-safe routines before and after the settlement of the abnormal state, respectively. By performing different fail-safe routines before and after the settlement of the abnormal state as mentioned above, it is possible to control the object of control as continuously as possible, for example, until the abnormal state is settled. After the settlement of the abnormal state, the fail-safe routine in which the control based on the control signal is prohibited, for example, is performed, because it is likely that the appropriate control cannot be performed.

According to a seventh aspect of the invention, as a specific example of those fail-safe routines, the output of the control signal to the object of control may be allowed before the settlement of the abnormal state, while control of the object of control by the control signal may be prohibited after the settlement of the abnormal state.

According to an eighth aspect of the invention, in a case where the determination routine unit determines that the relationship between the control signal and the simplified control signal is not normal, or in a case where the monitor routine unit calculates the monitor data indicating that it is to be determined in the determination routine by the determination routine unit that the relationship between the control signal and the simplified control signal is abnormal, when the determination routine unit determines that the relationship between the dummy simplified control signal and its expected value is normal and the monitor routine unit calculates the monitor data indicating that it is to be determined in the determination routine by the determination routine unit that the relationship between the dummy simplified signal and its expected value is normal, the fail-safe routine unit may perform a fail-safe routine for controlling the object of control using the simplified control signal.

In the above case, there is a high possibility that not the control signal but the simplified control signal is correct. Therefore, the use of the simplified control signal can provide more appropriate control as compared to a case where the control signal is used. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
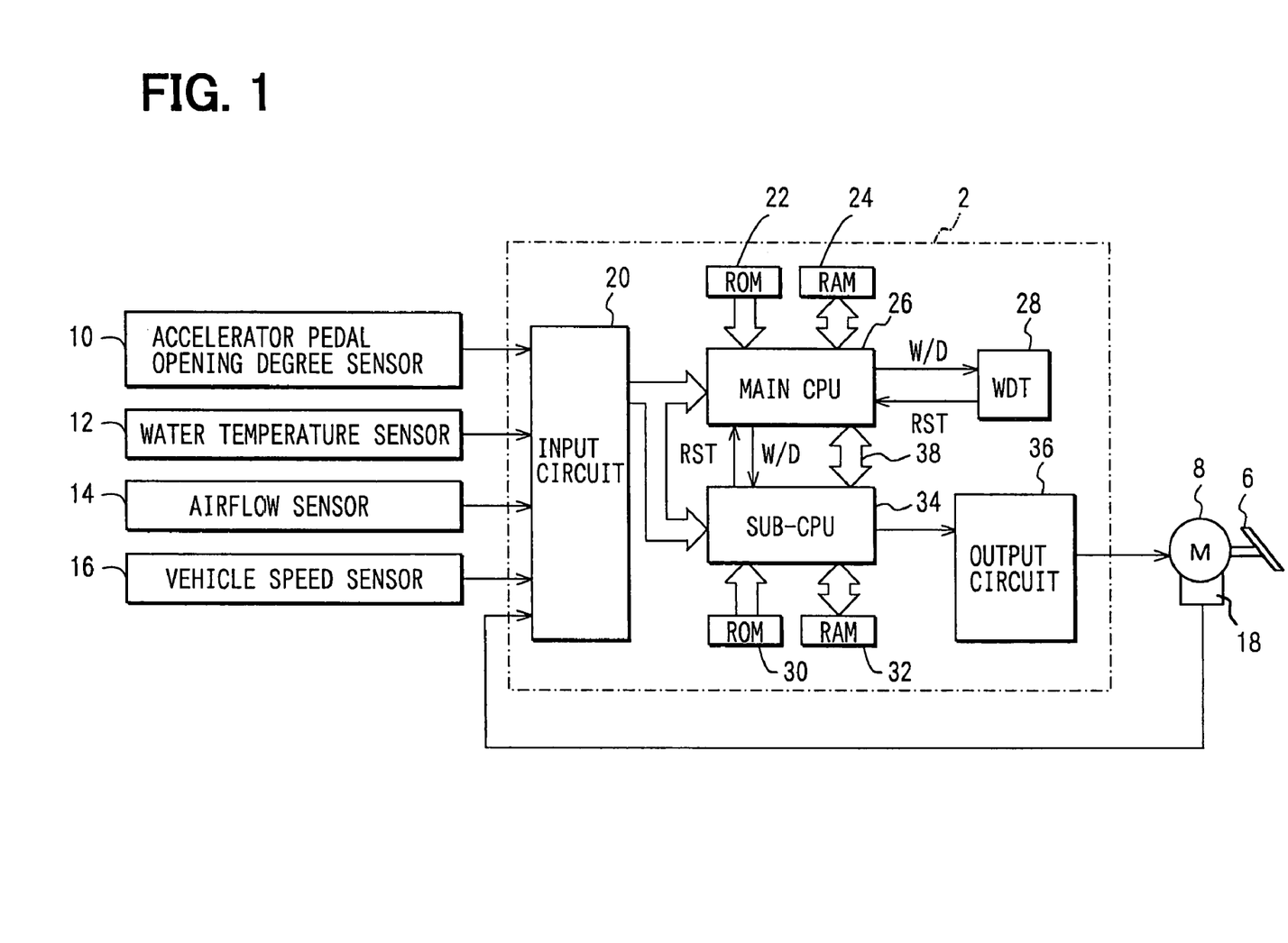
FIG. 1 is a block diagram showing a structure of an electronic control unit according to an embodiment of the present invention.

An embodiment of an electronic control unit according to an embodiment of the present invention is described below on the basis of the accompanying drawings. FIG. 1 is a block diagram showing a configuration of the electronic control unit according to the present embodiment. The electronic control unit of the present embodiment can be applied to an engine control unit for controlling an internal combustion engine mounted in a vehicle. This engine control unit controls ignition timing, the amount of fuel injected in the internal combustion engine, and a throttle valve 6 provided in an intake path of the internal combustion engine. In the following description, the control of the throttle valve 6 by the engine control unit is described.

As shown in FIG. 1, the engine control unit 2 of the present embodiment (hereinafter, simply referred to as a control unit) includes an input circuit 20 that inputs a signal from an accelerator pedal opening degree sensor 10 for detecting the degree of the opening of an accelerator pedal (hereinafter, referred to as a pedal opening degree). The control unit 2 further includes a signal from a water-temperature sensor 12 for detecting the temperature of coolant in the internal combustion engine, a signal from an air-flow sensor 14 for detecting the intake air flow in the intake path of the internal combustion engine, a signal from a vehicle speed sensor 16 for detecting the traveling speed of the vehicle, and a signal from an opening degree sensor 18 that detects the actual degree of opening of the throttle valve 6 from the driving amount of a driving motor 8 for driving the throttle valve 6 and the like. The input circuit 20 also outputs the respective input signals after converting them into digital signals.

The control unit 2 further includes a ROM 22 in which logic for calculating a target degree of throttle opening that serves as a control signal for controlling the degree of opening of the throttle valve 6 and a program related to a determination routine for determining whether or not that logic normally functions have been stored in advance. Also in the ECU 2, there is a main CPU 26 for executing calculation of the target opening degree of the throttle valve 6 and various control routines for determining whether the calculation is normal or abnormal in accordance with the program stored in the ROM 22 and a RAM 24 for temporarily storing the result of the routine executed by the main CPU 26.

The main CPU 26 is connected to a watchdog timer (WDT) 28. The WDT 28 monitors whether or not a watchdog pulse W/D is output from the main CPU 26 at regular intervals, and outputs a reset signal RST to the main CPU 26 when the output of the watchdog pulse W/D is stopped. The control unit 2 further includes a ROM 30 in which a monitor routine for calculating monitor data for monitoring whether the determination routine by the main CPU 26 is normal or abnormal and a program related to a control routine for controlling the opening degree of the throttle valve 6 based on the target degree of throttle opening transmitted from the main CPU 26, a sub-CPU 34 for monitoring the determination routine by the main CPU 26 and controlling the opening degree of the throttle valve 6, and a RAM 32 for temporarily storing the result of the routine by the sub-CPU 34.

In the control unit 2 of the present embodiment, the main CPU 26 determines whether or not the logic for calculating the target degree of throttle opening functions normally by executing a routine shown in FIG. 2, and transmits to the sub-CPU 34 a target control opening degree of the throttle valve 6 (hereinafter, simply referred to as a target degree of throttle opening) calculated based on the aforementioned signals input from the input circuit 16 in a case where it is determined that the logic functioned normally. The sub-CPU 34 then outputs a driving command in accordance with the target degree of throttle opening to an output circuit 36. Then, the throttle driving motor 8 is operated by the output circuit 36, thereby the opening of the throttle valve 6 is adjusted to be coincident with the target degree of the throttle opening.

Moreover, in the control unit 2 of the present embodiment, the aforementioned signals input from the input circuit 20 to the main CPU 26 are also input to the sub-CPU 34. In addition, the main CPU 26 and the sub-CPU 34 are connected to communicate with each other via a serial communication line 38.

The sub-CPU 34 executes normal monitoring using the watchdog pulse, in which the sub-CPU 34 monitors whether or not the watchdog pulse W/D is output from the main CPU 26 at regular intervals and outputs the reset signal RST to the main CPU 26 when the output of the watchdog pulse W/D is stopped. The sub-CPU 34 further monitors whether or not the determination routine by the main CPU 26 operates normally by executing a monitor routine shown in FIG. 7 to be described later.

Next, routines respectively executed by the main CPU 26 and the sub-CPU 34 will be described. FIG. 2 is a flowchart of the routine executed by the main CPU 26 (main CPU routine). Execution of this main CPU routine starts when an ignition switch (not shown) of the vehicle is turned on. Moreover, the main CPU routine is repeated at a predetermined time interval.

In Step S100, a target throttle opening degree calculation logic for calculating the target degree of opening of the throttle valve 6 is called, thereby the target degree of throttle opening is calculated based on the signals detected by the respective sensors. The calculation result is temporarily stored in the RAM 24.

Then, in Step S110, a determination routine (check routine) is performed for determining whether or not the target throttle opening degree calculation logic normally functions. The details of this check routine are shown in the flowchart of FIG. 3.

Figure 3:
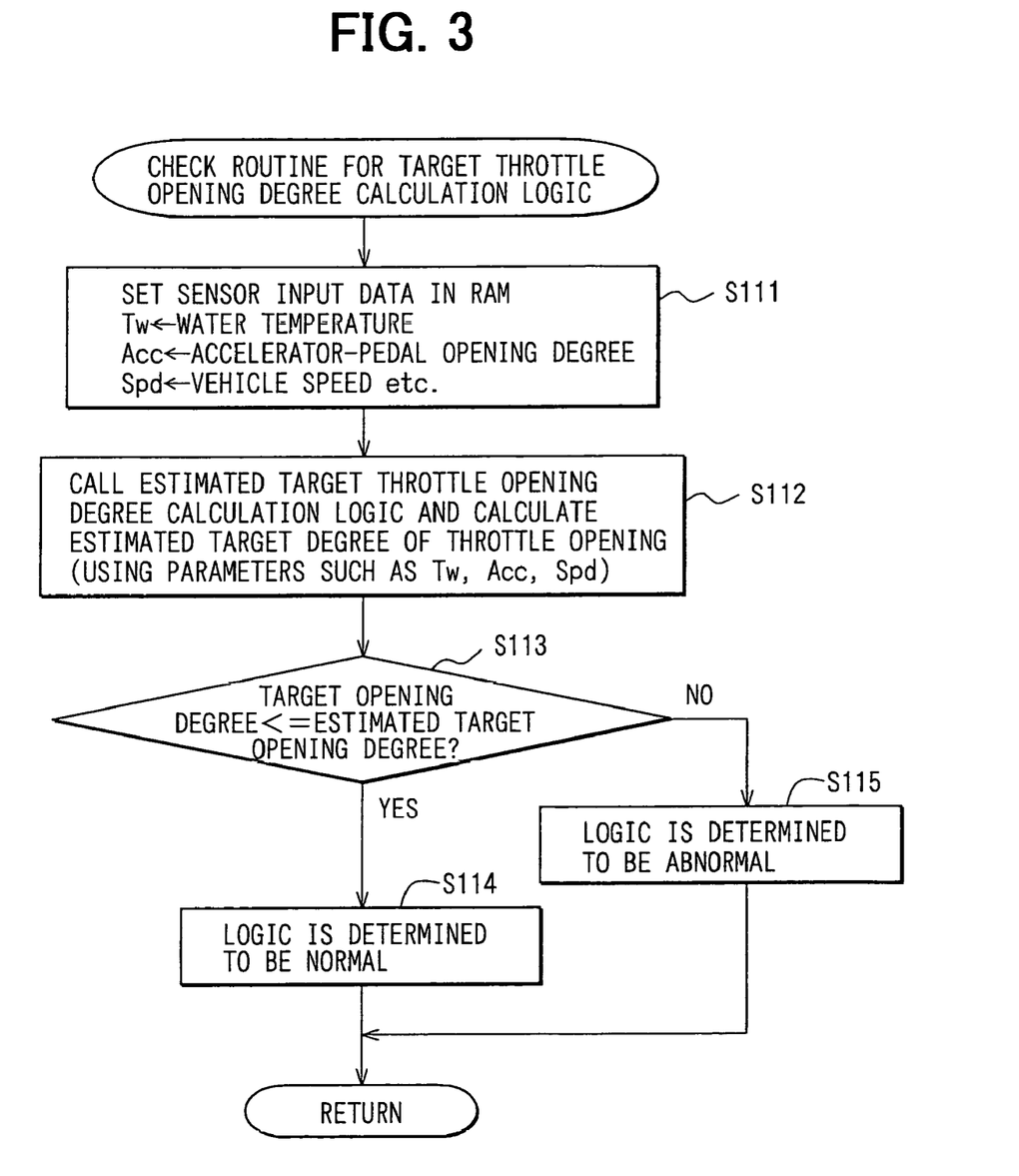
FIG. 3 is a flowchart of a check routine for a target throttle opening degree calculation logic.

In Step S111 in FIG. 3, input data of the detection signals of the respective sensors that are used in calculation of the target degree of throttle opening in Step S100, is set in the RAM 24 once. The reason why the input data is set in the RAM 24 once is as follows. An estimated target throttle opening degree calculation logic is called in the routine shown in this flowchart and a routine described later, shown in FIG. 4. Therefore, in order to achieve easier switching of input and output values and prevent incorrect use of the output value, the input and output values are stored in the RAM 24 once.

Then, in Step S112, the estimated target throttle opening degree calculation logic is called, and an estimated target degree of throttle opening is calculated based on the input data set in the RAM 24 in Step S111. The calculation result is stored in the RAM 24 once.

Here, a difference between the target throttle opening calculation logic and the estimated target throttle opening calculation logic is described. The target throttle opening degree calculation logic calculates the target degree of throttle opening used for actually controlling the opening degree of the throttle valve 6. Therefore, a degree of throttle opening that is requested from the pressed amount of the accelerator pedal detected by the accelerator-pedal opening degree sensor 10 is used as a base and is subjected to various types of correction, thereby finally calculating the target degree of throttle opening.

For example, immediately after the start of the internal combustion engine, it is known that the correction amounts for the throttle opening degree at the start are calculated based on each of the coolant temperature, the degree of warm-up or temperature of the catalytic converter, the state of deceleration of the vehicle, the idle-up state, and the like in the internal combustion engine. Then, the aforementioned pedal-requested throttle opening degree is increased/decreased by the above throttle opening correction amounts so that the target degree of throttle opening can be calculated.

Moreover, in the target throttle opening degree calculation logic, a position at which the accelerator pedal is fully closed or a position at which the throttle valve 6 is fully closed is learned based on the detection signals of the accelerator-pedal opening degree sensor 10 or the throttle opening degree sensor 18. Then, using the learned position as a reference, the opening degree of the accelerator pedal (pushed amount of the accelerator pedal) or the opening degree of the throttle valve 6 is calculated from the detection signals of the accelerator-pedal opening degree sensor 10 or the throttle opening degree sensor 18.

In this manner, in the target throttle opening degree calculation logic, the pedal-requesting throttle opening degree is subjected to various types of correction in detail in order to consider the state of the internal combustion engine and to reduce error factors in the detection signals of the respective sensors. Additionally, the estimated target throttle opening degree calculation logic is configured more simply compared to the target throttle opening degree calculation logic. This is because the estimated target throttle opening degree calculation logic is used for calculating the estimated target throttle opening degree that serves as a reference for determining whether or not the target throttle opening degree calculated by the target throttle opening degree calculation logic is normal. The estimated target degree of throttle opening thus calculated in accordance with the estimated target throttle opening degree calculation logic having such a simplified configuration is not always coincident with the target degree of throttle opening. However, by configuring the estimated target throttle opening degree calculation logic in such a manner that the estimated target throttle opening degree is always larger than a control signal or by configuring such that the difference between the estimated target throttle opening degree and the control signal is equal to or less than a predetermined value, for example, it can be determined whether the target degree of throttle opening is normal or abnormal from the relationship of magnitude between the estimated target degree and the target degree of throttle opening or the magnitude of the difference between them.

In order to configure the estimated target throttle opening degree calculation logic more simply compared to the target throttle opening degree calculation logic, an expression for calculation is simplified by, for example, omitting several correction terms in the target throttle opening calculation logic, altering variable values to fixed values in calculation of the pedal-requesting throttle opening degree, calculation of the correction amount by each correction term and calculation of the learned value, or replacing a plurality of maps with a single typical map. By simply configuring the estimated target throttle opening degree calculation logic in the above manner, it is possible to reduce operation load in the determination routine for determining whether the target degree of throttle opening calculated by the target throttle opening degree calculation logic is normal or abnormal.

In Step S113, the target degree of throttle opening calculated in Step S100 is compared to the estimated target degree of throttle opening calculated in Step S112, thereby it is determined whether or not the relationship between them is normal, i.e., whether or not the target throttle opening degree is equal to or less than the estimated target throttle opening degree in the present embodiment. In a case where the relationship between the target throttle opening degree and the estimated target throttle opening degree is determined to be normal in that determination, it is determined in Step S114 that the target throttle opening degree calculation logic functions normally. On the other hand, in a case where the relationship between the target throttle opening degree and the estimated target throttle opening degree is determined to be abnormal, it is determined in Step S115 that the target throttle opening degree calculation logic functions abnormally.

Figure 2:
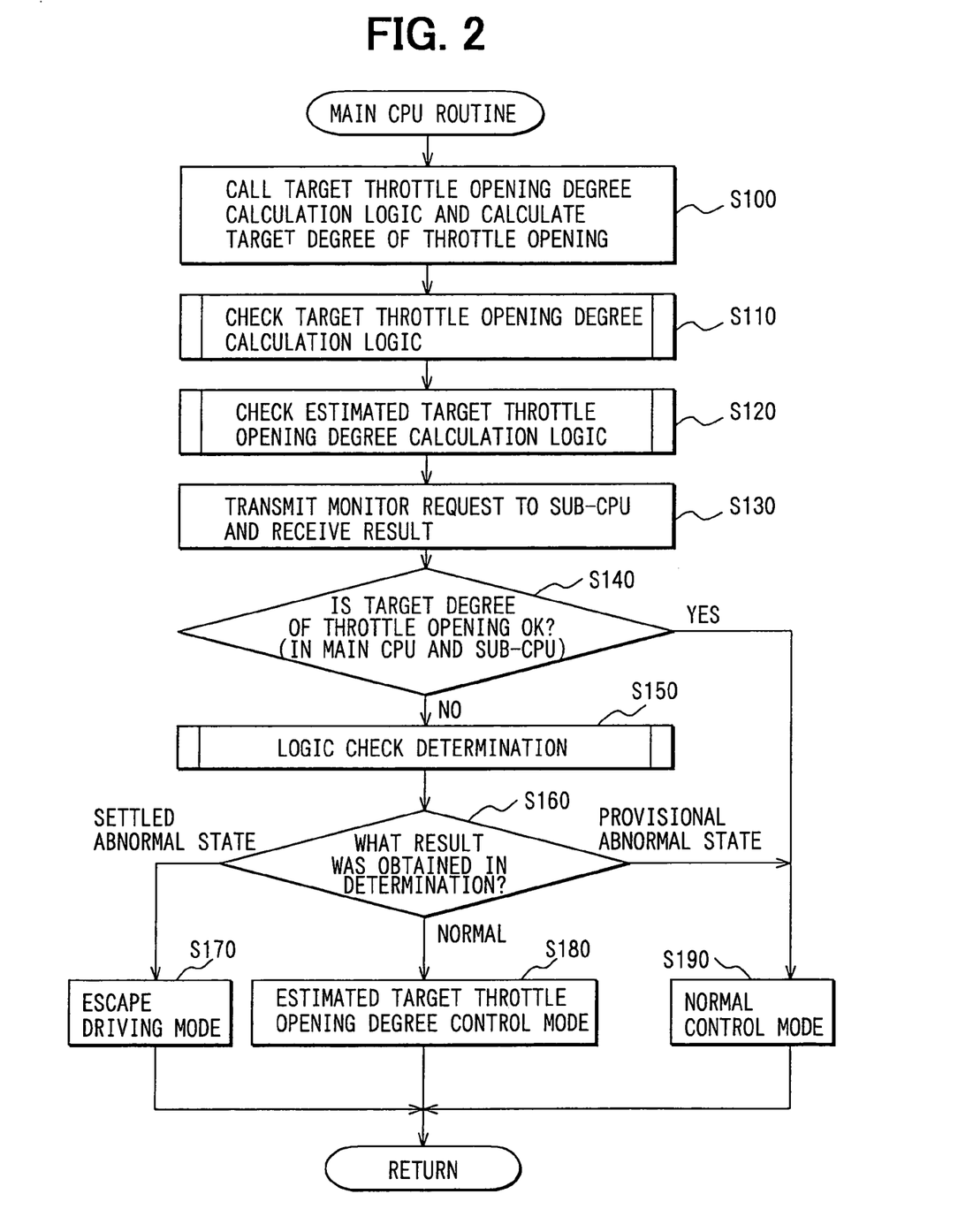
FIG. 2 is a flowchart of a routine executed by a main CPU of the electronic control unit.

Then, in Step S120 of the flowchart shown in FIG. 2, a determination routine (check routine) for checking whether or not the estimated target throttle opening degree calculation logic correctly calculates the estimated target degree of throttle opening is performed. More specifically, in this check routine, a dummy estimated target degree of throttle opening is calculated based on predetermined dummy data in accordance with the estimated target throttle opening degree calculation logic, and the thus calculated dummy estimated target degree of throttle opening is compared to an expected value of the estimated target degree of throttle opening prepared in advance to correspond to that dummy data. When the dummy estimated target degree of throttle opening calculated based on the dummy data is coincident with the expected value prepared in advance in that comparison, it is determined that the estimated target throttle opening degree calculation logic correctly calculates the estimated target degree of throttle opening. The details of this check routine are shown in the flowchart of FIG. 4.

Figure 4:
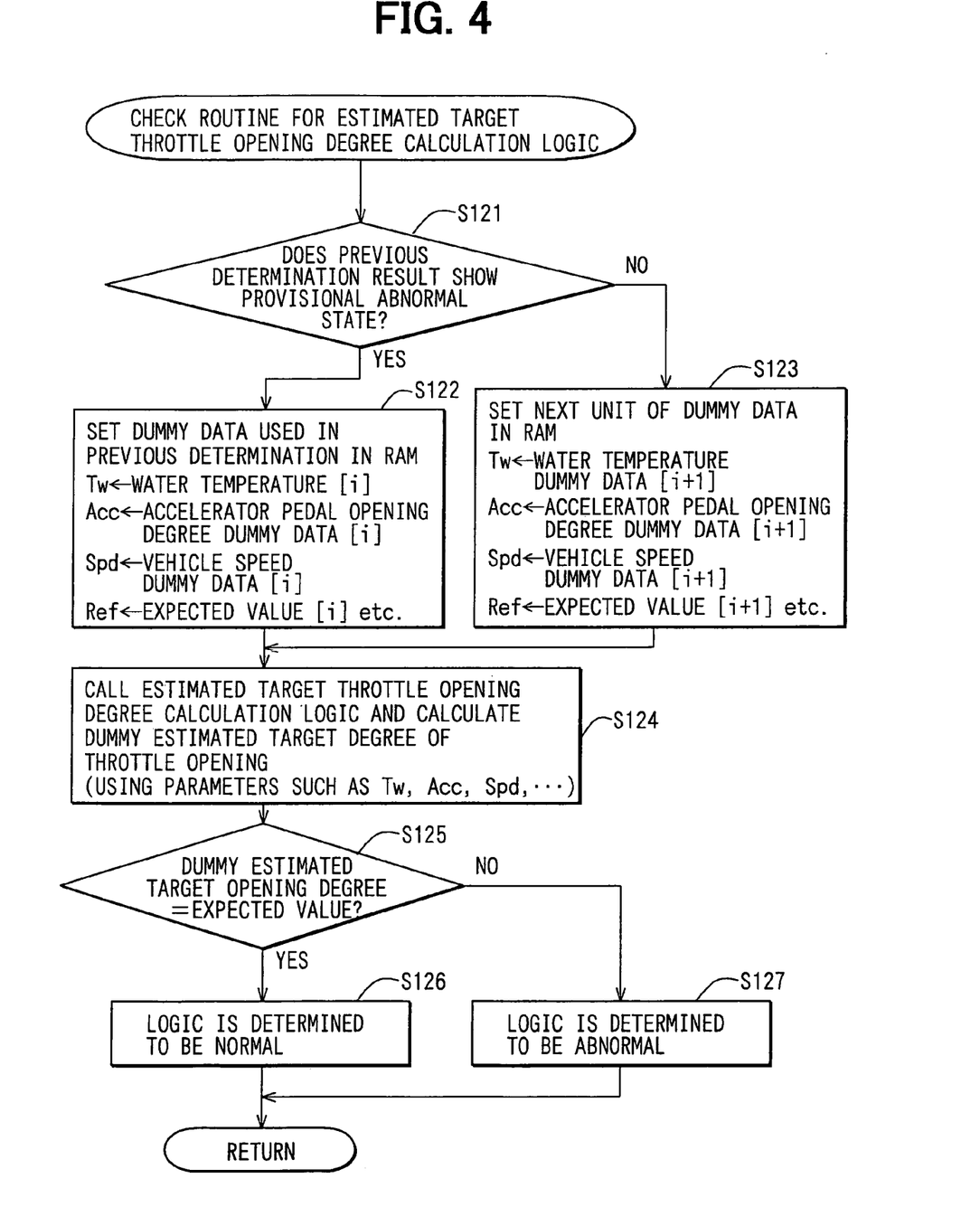
FIG. 4 is a flowchart of a check routine for an estimated target throttle opening degree calculation logic.
Figure 5:
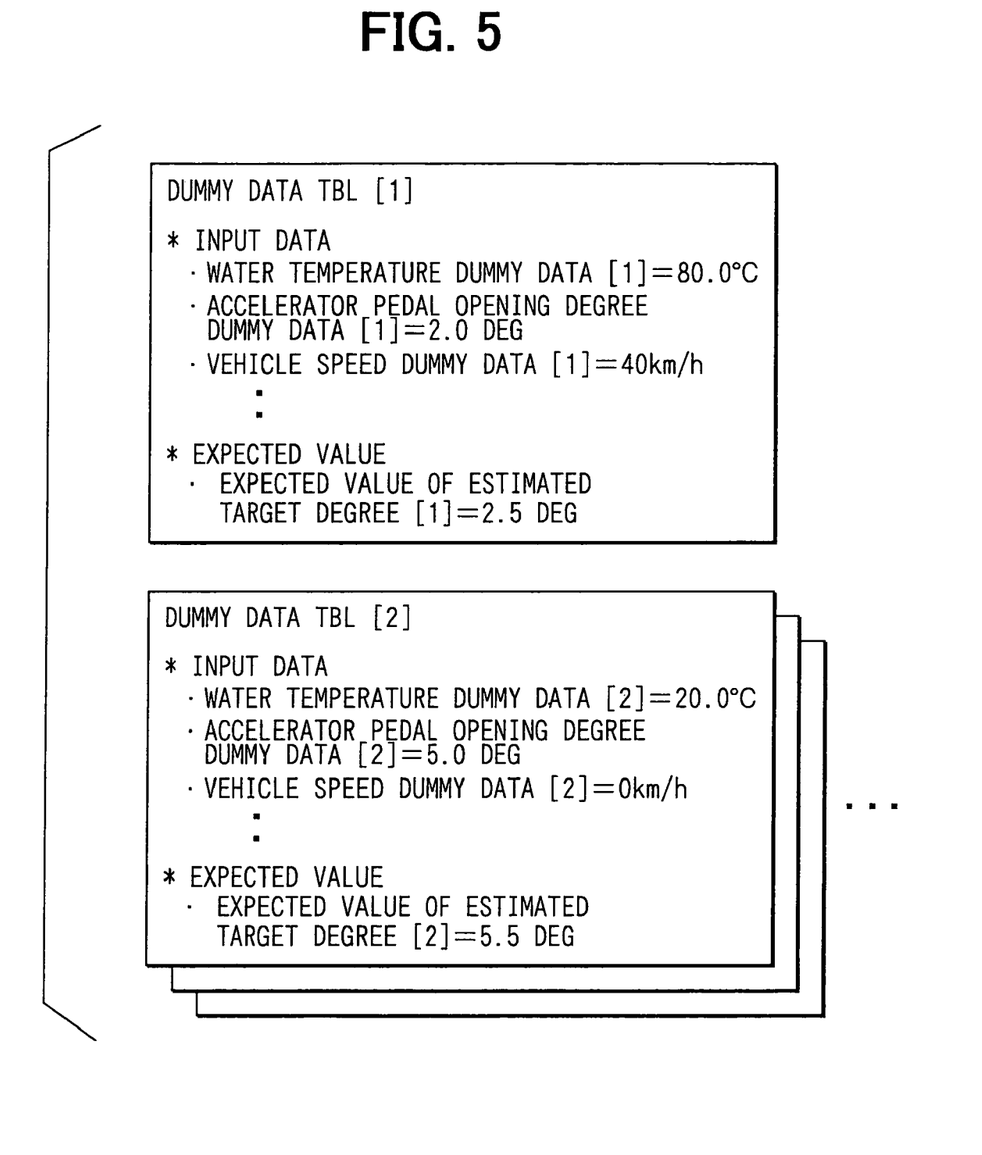
FIG. 5 is a diagram showing a format of dummy data used in the check routine for the estimated target throttle opening degree calculation logic.

In FIG. 4, in Step S121, the estimated target throttle opening degree calculation logic is already determined to be abnormal and it is then determined whether or not the current state is a provisional abnormal state where the number of times the estimated target throttle opening degree calculation logic is determined to be abnormal is less than a predetermined number. Then, in a case where it is determined that the current state is not the provisional-abnormal state, the routine goes to Step S123. In Step S123, one piece of a plurality of pieces of dummy data that respectively have a plurality of numbers assigned thereto, as shown in FIG. 5, is set in the RAM 24, after the number of the one piece of the dummy data is updated. On the other hand, in a case where it is determined in Step S121 that the current state is the provisional-abnormal state, the routine goes to Step S122 where the same piece of the dummy data as the previous one is set in the RAM 24.

The dummy data is formed by input data such as water-temperature dummy data, dummy data of accelerator-pedal opening degree, vehicle-speed dummy data for calculating the dummy estimated target throttle opening degree in accordance with the estimated target throttle opening degree calculation logic, and the expected value of the estimated target degree of throttle opening that is to be calculated from that input data.

When the main CPU 26 calculates the estimated target degree of throttle opening in accordance with the aforementioned estimated target throttle opening degree calculation logic, an abnormal operation may occur only for data having a specific pattern. In this case, after the pattern of data used in the calculation of the estimated target throttle opening degree was changed the abnormal operation does not occur, and therefore it is determined that the estimated target throttle opening degree can be calculated normally. Thus, in the present embodiment, in order to allow the abnormal state to be certainly and rapidly determined even in a case where the abnormal operation occurs only for the data having a specific pattern, when the abnormal state occurred once, the dummy estimated target throttle opening is calculated again by using the same dummy data. On the other hand, in a case where it is not determined that the estimated target throttle opening degree calculation logic is in the provisional-abnormal state, the dummy data is updated in order to confirm whether or not the estimated target throttle opening degree can be calculated correctly based on various patterns of data.

Please note that it cannot be determined with certain that the estimated target throttle opening degree calculation logic functions abnormally when it is determined only once that the relationship between the dummy estimated target degree of throttle opening calculated based on the dummy data and the expected value thereof is not normal based on the comparison of the calculated dummy estimated target throttle opening degree and the expected value thereof. This is because only one determination that the above relationship is not normal may be caused by a simple error in retrieving data, for example. Therefore, in the present embodiment, the abnormal state of the estimated target throttle opening degree calculation logic is settled when it is determined a predetermined number of times that the relationship between the dummy estimated target degree of throttle opening and the expected value thereof is abnormal. In the provisional abnormal state that is a state before declaration or settlement of the abnormal state, it is determined a plurality of number of times whether or not the relationship between the dummy estimated target degree of throttle opening and the expected value thereof is normal by using the same dummy data.

In Step S124 in FIG. 4, the estimated target throttle opening degree calculation logic is called, and the dummy estimated target degree of throttle opening is calculated based on the dummy data set in the RAM 24 in Step S122 or S123. The calculation result is stored in the RAM 24 once. Then, in Step S125, the dummy estimated target degree of throttle opening and the expected value thereof, which are set in the RAM 24, are compared to each other. In a case where it is determined that the dummy estimated target degree of throttle opening and the expected value thereof are equal, it is determined in Step S126 that the estimated target throttle opening calculation logic functions normally. To the contrary, in a case where it is determined that the relationship between the dummy estimated target degree of throttle opening and the expected value thereof is abnormal, it is determined in Step S127 that the estimated target throttle opening degree calculation logic is abnormal.

When the check of the target throttle opening degree calculation logic in Step S110 and the check of the estimated target throttle opening degree calculation logic in Step S120 are finished, a monitor request is transmitted to the sub-CPU 34 and the result of the monitor is received in Step S130. In other words, in the present embodiment, not only the check of whether or not the target throttle opening degree calculation logic and the estimated target throttle opening degree calculation logic function normally in the main CPU 26 is performed, but also calculation of monitor data for monitoring whether or not the check (determination routine) in the main CPU 26 operates normally is performed in the sub-CPU 34. In this manner, reliability of the check function in the main CPU can be enhanced.

Figure 6:
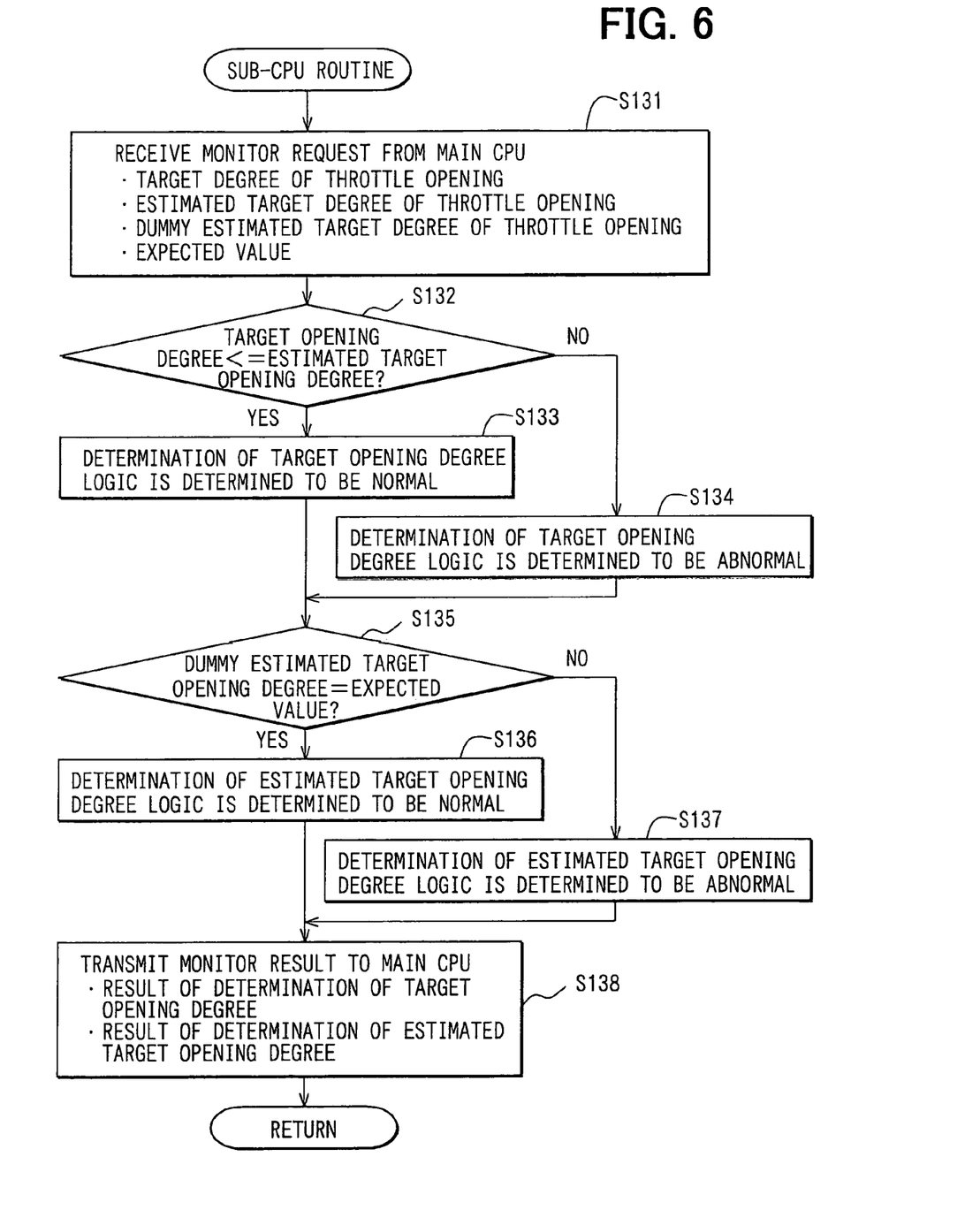
FIG. 6 is a flowchart of a routine executed by a sub-CPU of the electronic control unit.

FIG. 6 is a flowchart of a routine executed in the sub-CPU (sub-CPU routine). First, the monitor request from the main CPU 26 is received in Step S131. The monitor request from the main CPU 26 contains the target degree and estimated target degree of throttle opening, and the dummy estimated target degree of throttle opening and the expected value thereof, that are used in determining whether or not the target throttle opening degree calculation logic and the estimated target throttle opening degree calculation logic functioned normally in the main CPU 26. The sub-CPU 34 stores them in the RAM 32 once.

In Step S132, it is determined if the target throttle opening degree is less than or equal to the estimated target throttle opening degree. In a case where the relationship between the target degree of throttle opening and the estimated target degree of throttle opening is normal, it is determined in Step S134 that relationship is to be determined to be normal in the target throttle opening degree determination logic, as monitor data. On the other hand, in a case where the relationship between the target degree of throttle opening and the estimated target degree of throttle opening is abnormal, it is determined in Step S133 that relationship is to be determined to be abnormal in the target throttle opening degree determination logic, as the monitor data.

In a case where the determination of whether or not the relationship between the target degree and the estimated target degree of throttle opening is normal is performed only in the main CPU 26, the relationship between them may be incorrectly determined to be normal, although that relationship is actually abnormal, because a determination order (comparison order or the like) in the main CPU 26 is abnormal. Therefore, in the present embodiment, the target degree and the estimated target degree of throttle opening are received from the main CPU 26 and they are also compared in the sub-CPU 34. In this manner, even in a case where the determination order in the main CPU 26 or the like is abnormal, the monitor data corresponds to the abnormal state when the relationship between the target degree and the estimated target degree of throttle opening is abnormal.

In Step S135, the dummy estimated target degree of throttle opening is compared to the expected value thereof, thereby it is determined whether or not the relationship between them is normal. In a case where the dummy estimated target degree of throttle opening is coincident with the expected value thereof and the relationship between them is normal in that determination, it is determined in Step S136 that that relationship is to be determined to be normal in the estimated target throttle opening degree determination logic, as the monitor data. To the contrary, in a case where the relationship between the dummy estimated target throttle opening degree and the expected value thereof is abnormal, it is determined in Step S137 that that relationship is to be determined to be abnormal in the estimated target throttle opening degree determination logic, as the monitor data.

In Step S138, the monitor result (monitor data) is transmitted to the main CPU 34. This monitor result is formed by the determination result indicating that the determination result by the target throttle opening degree determination logic is to be normal or abnormal and the determination result indicating that the determination result by the estimated target throttle opening degree determination logic is to be normal or abnormal.

When the monitor result from the sub-CPU 34 is received in Step S130 of the flowchart in FIG. 2, it is determined in Step S140 whether or not the main CPU 26 determined that the target degree of throttle opening was correctly calculated in accordance with the target throttle opening calculation logic and whether or not the sub-CPU 36 calculated the monitor result indicating that the determination result by the determination routine in the main CPU 26 is to be normal. More specifically, it is determined in the main CPU 26 in Steps S114 and S115 of the flowchart in FIG. 3 whether or not the target degree of throttle opening was correct, and the monitor result by the sub-CPU 36 is calculated in Steps S133 and S134 of the flowchart in FIG. 6. Therefore, determination based on the determination result and monitor result is performed.

When both the determination result by the main CPU 26 and the monitor result by the sub-CPU 34, related to the target degree of throttle opening, are OK in the determination in Step S140, the throttle valve 6 is controlled in a normal control mode in Step S190. On the other hand, when at least one of the determination result by the main CPU 26 and the monitor result by the sub-CPU 34 is abnormal or not OK (NG), a check determination routine for the estimated target throttle opening degree calculation logic is performed in Step S150.

Figure 7:
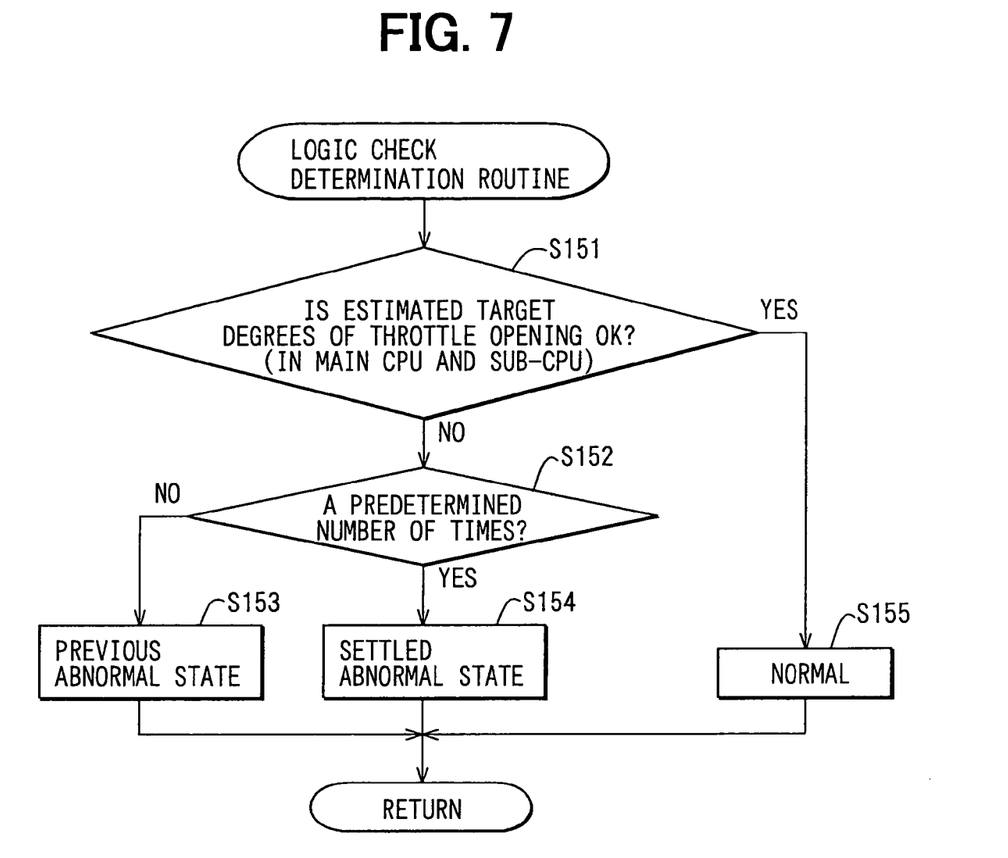
FIG. 7 is a flowchart of a logic check determination routine.

The details of this check determination routine are shown in a flowchart of FIG. 7. As shown in FIG. 7, it is determined in Step 151 whether or not the main CPU 24 determined that the estimated target throttle opening calculation logic correctly calculated the estimated target degree of throttle opening and whether or not the sub-CPU 36 calculated the monitor result indicating that the result of the determination routine by the main CPU 26 is to be normal. More specifically, it is determined by the main CPU 26 whether or not the estimated target degree of throttle opening is correct in Steps S126 and S127 of the flowchart of FIG. 4, and the monitor result by the sub-CPU 26 is calculated in Steps S136 and S137 of the flowchart of FIG. 6. Therefore, the determination based on the determination result and monitor result is performed. In a case where the determination in Step S151 determines that the main CPU 26 and the sub-CPU 34 are OK, it is determined in Step S155 that the check of the estimated target throttle opening degree calculation logic was done normally.

On the other hand, in a case where at least one of the determination result by the main CPU 26 and the monitor result by the sub-CPU 34 is NG, the number of times it was successively determined that the determination result or monitor result was NG is counted in Step S152. When this counted number of times is less than a predetermined number, the determination that the abnormal state occurs may be concluded because of the error of retrieving data or the like, as mentioned above. Therefore, in Step S153, it is determined that the result of the check of the estimated target throttle opening degree calculation logic is in the provisional abnormal state. In the provisional abnormal state, when the number of times it was determined that at least one of the determination result by the main CPU 26 and the monitor result by the sub-CPU 34 was NG has reached the predetermined number, it is determined that the abnormal state is settled in Step S154.

After the logic check determination is done in Step S150 in the aforementioned manner, the result of that determination is judged in Step S160. At that judgment, when it is determined that the abnormal state was settled, the routine goes to Step S170 and the control mode of the throttle valve 6 is set to an escape driving mode. In this escape driving mode, the opening degree of the throttle valve 6 is fixed to, for example, an opening degree at which the internal combustion engine is driven at an idling engine speed, so as to prevent the opening degree of the throttle valve 6 from opening to an abnormal opening degree. In a case where it is determined that the current state is the provisional abnormal state in Step S160, the abnormal state has not been settled yet, i.e., there is a possibility that the current state is a state in which the throttle valve 6 can be appropriately controlled. Therefore, the control mode for the throttle valve 6 is set to the normal control mode.

In this normal control mode, the target degree of throttle opening is calculated based on the respective detection signals in the main CPU 26 by using the aforementioned target throttle opening degree calculation logic. The thus calculated target degree of throttle opening is transmitted to the sub-CPU 34. The sub-CPU 34 then adjusts the driving motor 8 via the output circuit 36 so as to make the opening degree of the throttle valve 6 coincident with that target degree of throttle opening.

In a case where it is determined in Step S160 that the determination result is normal, the control mode for the throttle valve 6 is set to an estimated target opening degree control mode in Step S180. In that estimated target opening degree control mode, the throttle valve 6 is controlled using the estimated target degree of throttle opening that is usually used only for determining whether the target degree of throttle opening is normal or abnormal. In other words, in a case where at least one of the determination results for the main CPU 26 and the sub-CPU 34 related to the target degree of throttle opening in Step S140 is NG but both the determination results for the main CPU 26 and the sub-CPU 34 related to the estimated target degree of throttle opening in Step S160 are normal, it can be estimated that something abnormal occurs in the target degree of throttle opening although the estimated target degree of throttle opening is correctly calculated. Thus, by continuing the control based on the estimated target degree of throttle opening, it is possible to appropriately control the throttle valve 6 and is also possible to suppress degradation of driving performance as compared to the escape driving mode.

As described above, according to the control unit 2 of the present embodiment, the data used by the main CPU 26 in the determination routine (the target degree and the estimated target degree of throttle opening, and the dummy estimated target degree of throttle opening and the expected value thereof) is transmitted to the sub-CPU 34. The sub-CPU 34 compares data pieces in each of the pairs so as to calculate the monitor data for monitoring whether or not the result of the determination routine by the main CPU 24 is correct. In this manner, the control unit 2 of the present embodiment does not determine whether or not the determination routine normally functions by one of the CPUs but performs determination and monitoring by both the main CPU 26 and the sub-CPU 34. Therefore, it is possible to enhance reliability of the determination routine for determining whether or not each logic routine functions normally.

The electronic control unit according to the present invention is not limited to the aforementioned embodiment but can be implemented with various modifications.

(1) For example, in the aforementioned embodiment, the determination routine for determining whether or not the target degree and the estimated target degree of throttle opening are correct is performed in the main CPU 26, while the calculation of the monitor data for monitoring whether or not that determination routine was performed correctly is performed in the sub-CPU 34. However, it is possible to alter the manner of assigning the functions to the main CPU 26 and the sub-CPU 34 in various ways. For example, the determination routine for determining whether or not the target degree and the estimated target degree of throttle opening are correct may be performed in the sub-CPU 34 while the monitor data for that determination routine may be calculated in the main CPU 26. Moreover, the determination routine for the target degree of throttle opening may be performed in the main CPU 26, the determination routine for the estimated target degree of throttle opening may be performed in the sub-CPU 34, and the monitor data processing for the respective determination routine may be performed in another CPU.

In addition, in the aforementioned embodiment, the monitor result is transmitted from the sub-CPU 34 to the main CPU 26, and the discrimination of the control mode for the throttle valve 6 based on the determination result in the main CPU 26 and the monitor result in the sub-CPU 34 is performed in the main CPU 26. However, this discrimination may be performed in the sub-CPU 34.

(2) In the electronic control unit 2 according to the aforementioned embodiment, it is determined whether or not the target degree of throttle opening calculated in accordance with the target throttle opening degree calculation logic is correct by comparing it with the estimated target degree of throttle opening calculated in accordance with the estimated target throttle opening degree calculation logic. It is also determined by using the dummy data whether or not the correct estimated target degree of throttle opening is calculated in accordance with the estimated target throttle opening degree calculation logic.

However, it may be determined whether or not the target throttle opening calculation logic calculates the correct target degree of throttle opening by inputting the dummy data to the target throttle opening degree calculation logic so as to calculate a dummy target degree of throttle opening and then determining whether or not the calculated dummy target throttle opening degree is coincident with (equal to) an expected value thereof. In this case, it is possible to omit the estimated target throttle opening degree calculation logic.

Moreover, the estimated target throttle opening degree calculation logic may be configured to perform the same operations as those in the target throttle opening degree calculation logic, instead of being configured more simply as compared to the target throttle opening degree calculation logic in the aforementioned embodiment.

(3) In the aforementioned embodiment, when both the determination result in the main CPU 26 and the monitor result in the sub-CPU 34 that are related to the target degree of throttle opening are OK (Step S140 in the flowchart of FIG. 2), the control mode for the throttle valve 6 is set to the normal control mode without performing the logic check determination (Step S150 in the flowchart of FIG. 2). However, the normal control mode may be set when both the determination result in the main CPU 26 and the monitor result in the sub-CPU 34 that are related to the target degree of throttle opening are OK and the result of the logic check determination is normal. In this case, when at least one of the determination result in the main CPU 26 and the monitor result in the sub-CPU 34 that are related to the target degree of throttle opening is NG, or when the result of the logic check determination is in the provisional-abnormal state a multiple number of times in succession, it is determined that the abnormal state is settled.

(4) In the aforementioned embodiment, in a case where the result of the logic check determination is in the provisional abnormal state, the control mode for the throttle valve 6 is set to the normal control mode. Alternatively, in light of preventing abnormal control without fail, the control mode for the throttle valve 6 may be set to the escape driving mode both in the provisional-abnormal state and the settled abnormal state. However, because the driving performance of the vehicle becomes significantly lower in the escape driving mode, the control mode for the throttle valve 6 in the provisional abnormal state may be set to a maximum opening limiting mode in which the opening degree of the throttle opening 6 is limited under a predetermined upper limit, for example.

(5) Moreover, in the aforementioned embodiment, in a case where at least one of the determination result in the main CPU 26 and the monitor result in the sub-CPU 34 that are related to the target degree of throttle opening is NG and the result of the logic check determination is normal, the control mode for the throttle valve 6 is set to the estimated target opening degree control mode. However, in this case, the throttle valve 6 may be controlled in the escape driving mode or the maximum opening limiting mode, instead of the estimated target opening degree control mode.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electronic control unit comprising a first computer and a second computer and outputting a control signal for an object of control based on a predetermined detection signal, the first computer comprising:

a determination routine unit operable to, in order to check an abnormal state of a logic function for operating the control signal based on the predetermined detection signal, operate a dummy control signal by using dummy data stored in advance in accordance with the logic function and to determine whether or not a relationship between the dummy control signal and an expected value of the dummy control signal, which expected value is stored with respect to the dummy data in advance, is normal; and a transmission unit operable to transmit the dummy control signal and the expected value thereof that are used in a determination routine by the determination routine unit to the second computer;

the second computer comprising:

a receiving unit operable to receive the dummy control signal and the expected value thereof; and a monitor routine unit operable to compare the dummy control signal and the expected value thereof received by the receiving unit so as to perform a calculation routine for calculating monitor data for monitoring whether or not a result of the determination routine by the determination routine unit is correct;

wherein the electronic control unit further comprises: a fail-safe routine unit operable to perform a fail-safe routine based on the determination result by the determination routine unit and the monitor data by the monitor routine unit;

the logic function includes a first logic function for operating the control signal based on the predetermined detection signal and a second logic function, for operating a simplified control signal based on the predetermined detection signal;

the determination routine unit further determines whether or not a relationship between the control signal operated in accordance with the first logic function and the simplified control signal operated in accordance with the second logic function is normal; and the transmission unit transmits the control signal and the simplified control signal, as well as the dummy control signal and the expected value thereof, to the second computer, and the monitor routine unit further compares the control signal with the simplified control signal to perform a calculation routine for calculating the monitor data for monitoring whether or not a result of the determination routine in the determination routine unit is correct.

2. An electronic control unit comprising a first computer and a second computer and outputting a control signal for an object of control based on a predetermined detection signal, the first computer comprising:

a determination routine unit operable to, in order to check an abnormal state of a logic function for operating the control signal based on the predetermined detection signal, operate a dummy control signal by using dummy data stored in advance in accordance with the logic function and to determine whether or not a relationship between the dummy control signal and an expected value of the dummy control signal, which expected value is stored with respect to the dummy data in advance, is normal; and a transmission unit operable to transmit the dummy control signal and the expected value thereof that are used in a determination routine by the determination routine unit to the second computer;

the second computer comprising:

a receiving unit operable to receive the dummy control signal and the expected value thereof; and a monitor routine unit operable to compare the dummy control signal and the expected value thereof received by the receiving unit so as to perform a calculation routine for calculating monitor data for monitoring whether or not a result of the determination routine by the determination routine unit is correct;

wherein the electronic control unit further comprises: a fail-safe routine unit operable to perform a fail-safe routine based on the determination result by the determination routine unit and the monitor data by the monitor routine unit;

a plurality of types of the dummy data are prepared;

when the determination routine unit determines that the relationship between the dummy control signal and the expected value thereof is normal, the determination routine unit repeats the determination routine while changing the plurality of types of dummy data; and when the determination routine unit determines that the relationship between the dummy control signal and the expected value thereof is abnormal in the previous determination routine, the determination routine unit operates the dummy control signal by using the same dummy data as that used in the previous determination routine and determines whether or not the relationship between the thus calculated dummy control signal and the expected value thereof is normal again.

3. An electronic control unit comprising a first computer and a second computer and outputting a control signal for an object of control based on a predetermined detection signal, the first computer comprising:

a determination routine unit operable to, in order to check an abnormal state of a logic function for operating the control signal based on the predetermined detection signal, operate a dummy control signal by using dummy data stored in advance in accordance with the logic function and to determine whether or not a relationship between the dummy control signal and an expected value of the dummy control signal, which expected value is stored with respect to the dummy data in advance, is normal; and a transmission unit operable to transmit the dummy control signal and the expected value thereof that are used in a determination routine by the determination routine unit to the second computer;

the second computer comprising:

a receiving unit operable to receive the dummy control signal and the expected value thereof; and a monitor routine unit operable to compare the dummy control signal and the expected value thereof received by the receiving unit so as to perform a calculation routine for calculating monitor data for monitoring whether or not a result of the determination routine by the determination routine unit is correct;

wherein the electronic control unit further comprises: a fail-safe routine unit operable to perform a fail-safe routine based on the determination result by the determination routine unit and the monitor data by the monitor routine unit;

in a case where it is determined, in the determination by the determination routine unit whether the relationship between the dummy control signal and the expected value thereof is normal or abnormal, that the relationship is abnormal a predetermined number of times, or in a case where the monitor data indicating that the determination routine by the determination routine unit is to determine that the relationship between the dummy control signal and the expected value thereof is abnormal is calculated in the monitor routine unit a predetermined number of times, the abnormal state of the determination routine is settled and the fail-safe routine unit performs different fail-safe routines before and after settlement of the abnormal state, respectively.

4. The electronic control unit according to claim 3, wherein the fail-safe routine allows the output of the control signal to the object of control before the settlement of the abnormal state, and prohibits the control of the object of control by the control signal after settlement of the abnormal state.

5. An electronic control unit comprising a first computer and a second computer and outputting a control signal for an object of control based on a predetermined detection signal, the first computer comprising:
   a determination routine unit operable to, in order to check an abnormal state of a logic function for operating the control signal based on the predetermined detection signal, operate a dummy control signal by using dummy data stored in advance in accordance with the logic function and to determine whether or not a relationship between the dummy control signal and an expected value of the dummy control signal, which expected value is stored with respect to the dummy data in advance, is normal; and
   a transmission unit operable to transmit the dummy control signal and the expected value thereof that are used in a determination routine by the determination routine unit to the second computer;
   the second computer comprising:
   a receiving unit operable to receive the dummy control signal and the expected value thereof; and
   a monitor routine unit operable to compare the dummy control signal and the expected value thereof received by the receiving unit so as to perform a calculation routine for calculating monitor data for monitoring whether or not a result of the determination routine by the determination routine unit is correct;
   wherein the electronic control unit further comprises: a fail-safe routine unit operable to perform a fail-safe routine based on the determination result by the determination routine unit and the monitor data by the monitor routine unit;
   the logic function includes a first logic function for operating the control signal based on the predetermined detection signal and a second logic function, for operating a simplified control signal based on the predetermined detection signal;
   the determination routine unit further determines whether or not a relationship between the control signal operated in accordance with the first logic function and the simplified control signal operated in accordance with the second logic function is normal; and
   in a case where the determination routine unit determines that the relationship between the control signal and the simplified control signal is not normal, or in a case where the monitor routine unit calculates the monitor data indicating that it is to be determined in the determination routine by the determination routine unit that the relationship between the control signal and the simplified control signal is abnormal, when the determination routine unit determines that the relationship between the dummy simplified control signal and the expected value thereof is normal and the monitor routine unit calculates the monitor data indicating that it is to be determined in the determination routine by the determination routine unit that the relationship between the dummy simplified signal and the expected value thereof is normal, the fail-safe routine unit performs a fail-safe routine for controlling the object of control using the simplified control signal.

6. The electronic control unit according to claim 1, wherein the determination routine unit inputs the dummy data to the second logic function to operate a dummy simplified control signal and determines whether or not a relationship between the dummy simplified control signal and an expected value thereof is normal.

7. The electronic control unit according to claim 2, wherein
   the logic function includes a first logic function for operating the control signal based on the predetermined detection signal and a second logic function, for operating a simplified control signal based on the predetermined detection signal, and
   the determination routine unit further determines whether or not a relationship between the control signal operated in accordance with the first logic function and the simplified control signal operated in accordance with the second logic function is normal.

8. The electronic control unit according to claim 7, wherein
   the determination routine unit inputs the dummy data to the second logic function to operate a dummy simplified control signal and determines whether or not a relationship between the dummy simplified control signal and an expected value thereof is normal.

9. The electronic control unit according to claim 3, wherein
   the logic function includes a first logic function for operating the control signal based on the predetermined detection signal and a second logic function, for operating a simplified control signal based on the predetermined detection signal, and
   the determination routine unit further determines whether or not a relationship between the control signal operated in accordance with the first logic function and the simplified control signal operated in accordance with the second logic function is normal.

10. The electronic control unit according to claim 9, wherein
    the determination routine unit inputs the dummy data to the second logic function to operate a dummy simplified control signal and determines whether or not a relationship between the dummy simplified control signal and an expected value thereof is normal.

11. The electronic control unit according to claim 5, wherein
    the determination routine unit inputs the dummy data to the second logic function to operate a dummy simplified control signal and determines whether or not a relationship between the dummy simplified control signal and an expected value thereof is normal.

12. A method of controlling an electronic control unit having at least a first computer and a second computer to output a control signal for an object of control based on a predetermined detection signal, the method comprising:
    operating the first computer to:
       operate the control signal based on the predetermined detection signal in accordance with a logic function;
       in order to check an abnormal state of the logic function, operate a dummy control signal by using dummy data stored in advance in accordance with the logic function and determine whether or not a relationship between the dummy control signal and an expected value of the dummy control signal, which expected value is stored with respect to the dummy data in advance, is normal; and transmit the dummy control signal and the expected value thereof that are used in a determination routine by the first computer to the second computer;

operating the second computer to:

receive the dummy control signal and the expected value thereof; and compare the received dummy control signal and the expected value so as to perform a calculation routine for calculating monitor data for monitoring whether or not a result of the determination routine by the first computer is correct;

performing a fail-safe routine based on the determination result by the first computer and the monitor data by the second computer;

wherein the logic function includes a first logic function for operating the control signal based on the predetermined detection signal and a second logic function, for operating a simplified control signal based on the predetermined detection signal, and the first computer further determines whether or not a relationship between the control signal operated in accordance with the first logic function and the simplified control signal operated in accordance with the second logic function is normal, the control signal and the simplified control signal, as well as the dummy control signal and the expected value thereof, is transmitted to the second computer, and the second computer further compares the control signal with the simplified control signal to perform a calculation routine for calculating the monitor data for monitoring whether or not a result of the determination routine in the first computer is correct.

13. A method of controlling an electronic control unit having at least a first computer and a second computer to output a control signal for an object of control based on a predetermined detection signal, the method comprising:

operating the first computer to:

operate the control signal based on the predetermined detection signal in accordance with a logic function:

in order to check an abnormal state of the logic function, operate a dummy control signal by using dummy data stored in advance in accordance with the logic function and determine whether or not a relationship between the dummy control signal and an expected value of the dummy control signal, which expected value is stored with respect to the dummy data in advance, is normal; and transmit the dummy control signal and the expected value thereof that are used in a determination routine by the first computer to the second computer;

operating the second computer to:

receive the dummy control signal and the expected value thereof; and compare the received dummy control signal and the expected value so as to perform a calculation routine for calculating monitor data for monitoring whether or not a result of the determination routine by the first computer is correct;

performing a fail-safe routine based on the determination result by the first computer and the monitor data by the second computer;

wherein a plurality of types of the dummy data are prepared;

when the first computer determines that the relationship between the dummy control signal and the expected value thereof is normal, the first computer repeats the determination routine while changing the plurality of types of dummy data; and when the first computer determines that the relationship between the dummy control signal and the expected value thereof is abnormal in the previous determination routine, the first computer operates the dummy control signal by using the same dummy data as that used in the previous determination routine and determines whether or not the relationship between the thus calculated dummy control signal and the expected value thereof is normal again.

14. A method of controlling an electronic control unit having at least a first computer and a second computer to output a control signal for an object of control based on a predetermined detection signal, the method comprising:

operating the first computer to:

operate the control signal based on the predetermined detection signal in accordance with a logic function;

in order to check an abnormal state of the logic function, operate a dummy control signal by using dummy data stored in advance in accordance with the logic function and determine whether or not a relationship between the dummy control signal and an expected value of the dummy control signal, which expected value is stored with respect to the dummy data in advance, is normal; and transmit the dummy control signal and the expected value thereof that are used in a determination routine by the first computer to the second computer;

operating the second computer to:

receive the dummy control signal and the expected value thereof; and compare the received dummy control signal and the expected value so as to perform a calculation routine for calculating monitor data for monitoring whether or not a result of the determination routine by the first computer is correct;

performing a fail-safe routine based on the determination result by the first computer and the monitor data by the second computer;

wherein in a case where it is determined, in the determination by the first computer whether the relationship between the dummy control signal and the expected value thereof is normal or abnormal, that the relationship is abnormal a predetermined number of times, or in a case where the monitor data indicating that the determination routine by the first computer is to determine that the relationship between the dummy control signal and the expected value thereof is abnormal is calculated in the second computer a predetermined number of times, the abnormal state of the determination routine is settled and different fail-safe routines are performed before and after settlement of the abnormal state, respectively.

15. The method according to claim 14, wherein the fail-safe routine allows the output of the control signal to the object of control before the settlement of the abnormal state, and prohibits the control of the object of control by the control signal after settlement of the abnormal state.

16. A method of controlling an electronic control unit having at least a first computer and a second computer to output a control signal for an object of control based on a predetermined detection signal, the method comprising:

operating the first computer to:

operate the control signal based on the predetermined detection signal in accordance with a logic function;

in order to check an abnormal state of the logic function, operate a dummy control signal by using dummy data stored in advance in accordance with the logic function and determine whether or not a relationship between the dummy control signal and an expected value of the dummy control signal, which expected value is stored with respect to the dummy data in advance, is normal; and transmit the dummy control signal and the expected value thereof that are used in a determination routine by the first computer to the second computer;

operating the second computer to:

receive the dummy control signal and the expected value thereof; and compare the received dummy control signal and the expected value so as to perform a calculation routine for calculating monitor data for monitoring whether or not a result of the determination routine by the first computer is correct;

performing a fail-safe routine based on the determination result by the first computer and the monitor data by the second computer;

wherein the logic function includes a first logic function for operating the control signal based on the predetermined detection signal and a second logic function, for operating a simplified control signal based on the predetermined detection signal, and the first computer further determines whether or not a relationship between the control signal operated in accordance with the first logic function and the simplified control signal operated in accordance with the second logic function is normal, in a case where the first computer determines that the relationship between the control signal and the simplified control signal is not normal, or in a case where the second computer calculates the monitor data indicating that it is to be determined in the determination routine by the first computer that the relationship between the control signal and the simplified control signal is abnormal, when the first computer determines that the relationship between the dummy simplified control signal and the expected value thereof is normal and the second computer calculates the monitor data indicating that it is to be determined in the determination routine by the first computer that the relationship between the dummy simplified signal and the expected value thereof is normal, a fail-safe routine is performed for controlling the object of control using the simplified control signal.

* * * * *